(12) United States Patent
Tkaczyk-Walczak et al.

(10) Patent No.: US 10,936,438 B2
(45) Date of Patent: Mar. 2, 2021

(54) AUTOMATED AND DISTRIBUTED BACKUP OF SENSOR DATA

(71) Applicant: International Business Machines Corporation, Armonk, NY (US)

(72) Inventors: Agnieszka Tkaczyk-Walczak, Cracow (PL); Krzysztof Fabjanski, Bielsko-Biala (PL); Marek Peszt, Cracow (PL); Piotr Jozef Walczak, Cracow (PL)

(73) Assignee: International Business Machines Corporation, Armonk, NY (US)

( * ) Notice: Subject to any disclaimer, the term of this patent is extended or adjusted under 35 U.S.C. 154(b) by 379 days.

(21) Appl. No.: 15/878,475

(22) Filed: Jan. 24, 2018

(65) Prior Publication Data

US 2019/0227880 A1 Jul. 25, 2019

(51) Int. Cl.
  *G06F 17/00* (2019.01)
  *G06F 11/14* (2006.01)
  *G06F 16/178* (2019.01)
  *G06F 16/174* (2019.01)

(52) U.S. Cl.
  CPC ........ *G06F 11/1464* (2013.01); *G06F 16/178* (2019.01); *G06F 16/1748* (2019.01); *G06F 2201/84* (2013.01)

(58) Field of Classification Search
  None
  See application file for complete search history.

(56) References Cited

U.S. PATENT DOCUMENTS

| | | | |
|---|---|---|---|
| 7,127,477 B2 * | 10/2006 | Duncombe | G06F 21/606 709/238 |
| 7,953,785 B2 | 5/2011 | Li et al. | |
| 8,213,332 B2 | 7/2012 | Prasad et al. | |
| 8,386,284 B2 * | 2/2013 | Connors | G06Q 30/02 705/7.11 |
| 8,768,901 B1 * | 7/2014 | Somerville | G06F 16/1752 707/697 |
| 8,818,919 B2 * | 8/2014 | Natarajan | G06Q 30/00 706/12 |

(Continued)

OTHER PUBLICATIONS

Mukherjee, "A Fully Decentralized, Peer-to-Peer Based Version Control System," Dissertation Thesis, 2011, 219 pages.

(Continued)

*Primary Examiner* — Hasanul Mobin
(74) *Attorney, Agent, or Firm* — Peter Edwards

(57) ABSTRACT

The invention relates to a sensor system. The sensor system comprises sensor devices. The sensor devices are configured for exchanging data via a network connection. Each of the sensor devices is configured to measure sensor data wherein each of the sensor devices comprises a local processor and a local memory coupled to the local processor. Each local memory comprises a local data repository. The local memory comprises local instructions which, when executed by the local processor, cause the local processor to: repeatedly store the sensor data in the local data repository as a data file, wherein each data file stored has a unique name; and repeatedly synchronize with the local data repository of the other of the sensor devices, wherein each local data repository maintains a complete copy of the data file of each of the sensor devices after synchronization.

20 Claims, 9 Drawing Sheets

(56) References Cited

U.S. PATENT DOCUMENTS

| | | | |
|---|---|---|---|
| 8,885,832 B2 | 11/2014 | Rhodes et al. | |
| 9,268,797 B2 | 2/2016 | Whitehead et al. | |
| 9,400,801 B1* | 7/2016 | Aplemakh | G06F 16/183 |
| 2004/0006506 A1* | 1/2004 | Hoang | G06Q 10/10 |
| | | | 705/14.65 |
| 2005/0198240 A1* | 9/2005 | Widera | G06F 1/14 |
| | | | 709/223 |
| 2009/0204700 A1* | 8/2009 | Satya Sudhakar | H04L 67/104 |
| | | | 709/224 |
| 2012/0040717 A1* | 2/2012 | Levy | G06F 40/205 |
| | | | 455/556.1 |
| 2012/0271121 A1* | 10/2012 | Della Torre | A61B 5/681 |
| | | | 600/301 |
| 2012/0290950 A1* | 11/2012 | Rapaport | H04N 21/8358 |
| | | | 715/753 |
| 2015/0066876 A1* | 3/2015 | Li | G06F 3/0641 |
| | | | 707/692 |
| 2015/0120663 A1 | 4/2015 | Le Scouarnec et al. | |
| 2015/0135284 A1* | 5/2015 | Bogard | G06F 21/35 |
| | | | 726/5 |
| 2015/0278258 A1* | 10/2015 | Kienzle | G06F 3/0484 |
| | | | 707/692 |
| 2015/0310444 A1* | 10/2015 | Chen | G06Q 20/3226 |
| | | | 705/44 |
| 2016/0253710 A1* | 9/2016 | Publicover | H04L 67/306 |
| | | | 705/14.66 |
| 2016/0277424 A1* | 9/2016 | Mawji | G06Q 20/4016 |
| 2017/0048348 A1* | 2/2017 | Chen | H04L 67/22 |
| 2017/0075959 A1* | 3/2017 | Branson | G06F 16/2456 |
| 2017/0080346 A1* | 3/2017 | Abbas | A63F 13/825 |
| 2017/0185630 A1* | 6/2017 | Tatourian | G06F 16/436 |
| 2017/0193002 A1* | 7/2017 | Shvachko | G06F 16/182 |
| 2018/0189332 A1* | 7/2018 | Asher | G06N 20/00 |

OTHER PUBLICATIONS

Lin et al., "Reliable Hierarchical Peer-to-Peer File Sharing Systems," IEEE, Region 10 Conference TENCON2006, 2006, 4 paes, DOI: 10.1109/TENCON.2006.344043.

Mell et al., "The NIST Definition of Cloud Computing," Recommendations of the National Institute of Standards and Technology, U.S. Department of Commerce, Special Publication 800-145, Sep. 2011, 7 pages.

\* cited by examiner

AUTOMATED AND DISTRIBUTED BACKUP OF SENSOR DATA

BACKGROUND

Users may use a variety of different sensor to monitor quantities that may be descriptive of athletic performance or quantities which could affect athletic performance. For example, an athlete may use one or more GPS sensors, a heart rate monitor, as well as sensors for detecting external temperature, barometric pressure, or altitude.

Different sensors may have different accuracies or performance characteristics. Also, different sensors may occasionally fail to record data due to such factors as power loss or even a failure to function properly. For example, a GPS sensor could temporarily be unable to receive satellite signals.

SUMMARY

In one aspect, the invention relates to a sensor system. The sensor system comprises sensor devices. The sensor devices are configured for exchanging data via a network connection. Each of the sensor devices is configured to measure sensor data. Each of the sensor devices comprises a local processor and a local memory coupled to the local processor. Each local memory comprises a local data repository. The local memory comprises local instructions which, when executed by the processor, cause the processor to repeatedly store the sensor data in the local data repository as a data file. Each data file stored has a unique name In each of these data files the data file has a unique name Execution of the instructions by the local processor further cause the local processor to repeatedly synchronize with the local data repository of the other sensor devices. Each local data repository maintains a complete copy of the data file of each of the sensor devices after synchronization.

According to a further embodiment of the invention, the method provides for a method of operating a sensor system. The sensor system comprises sensor devices. The sensor devices are configured for exchanging data via a network connection. Each of the sensor devices is configured to measure sensor data. Each of the sensor devices comprises a local processor and a local memory coupled to the local processor. Each local memory comprises a local data repository. The local memory comprises local instructions which, when executed by the processor, cause the processor to perform the method of repeatedly storing the sensor data in the local data repository as a data file. Each data file stored has a unique name. The local instructions, when executed by the local processor, further cause the local processor to perform the method of repeatedly synchronizing with the local data repository of the other sensor devices. Each local data repository maintains a complete copy of the data file of each of the sensor devices after synchronization.

According to a further embodiment of the present invention, the invention further provides for a computer program product for operating a sensor system. The computer program product comprises a computer-readable storage medium having program instructions embodied therewith. The sensor system comprises sensor devices. The sensor devices are configured for exchanging data via a network connection. Each of the sensor devices is configured to measure sensor data. Each of the sensor devices comprises a local processor. Each of the sensor devices also comprises a local memory coupled to the local processor. Each local memory comprises a local data repository. The computer-readable storage medium is not a transitory signal per se. The program instructions are executable by the local processor to cause the sensor device to perform a method comprising repeatedly storing the sensor data in the local data repository as a data file. Each data file stored has a unique name. The method further comprises repeatedly synchronizing with the local data repository of the other sensor devices. Each local data repository maintains a complete copy of the data file of each of the sensor devices after synchronization.

Embodiments of the present invention and/or examples described herein can be freely combined with each other if they are not mutually exclusive.

BRIEF DESCRIPTION OF THE SEVERAL VIEWS OF THE DRAWINGS

In the following embodiments of the invention are explained in greater detail, by way of example only, making reference to the drawings in which.

DETAILED DESCRIPTION

Figure 1:
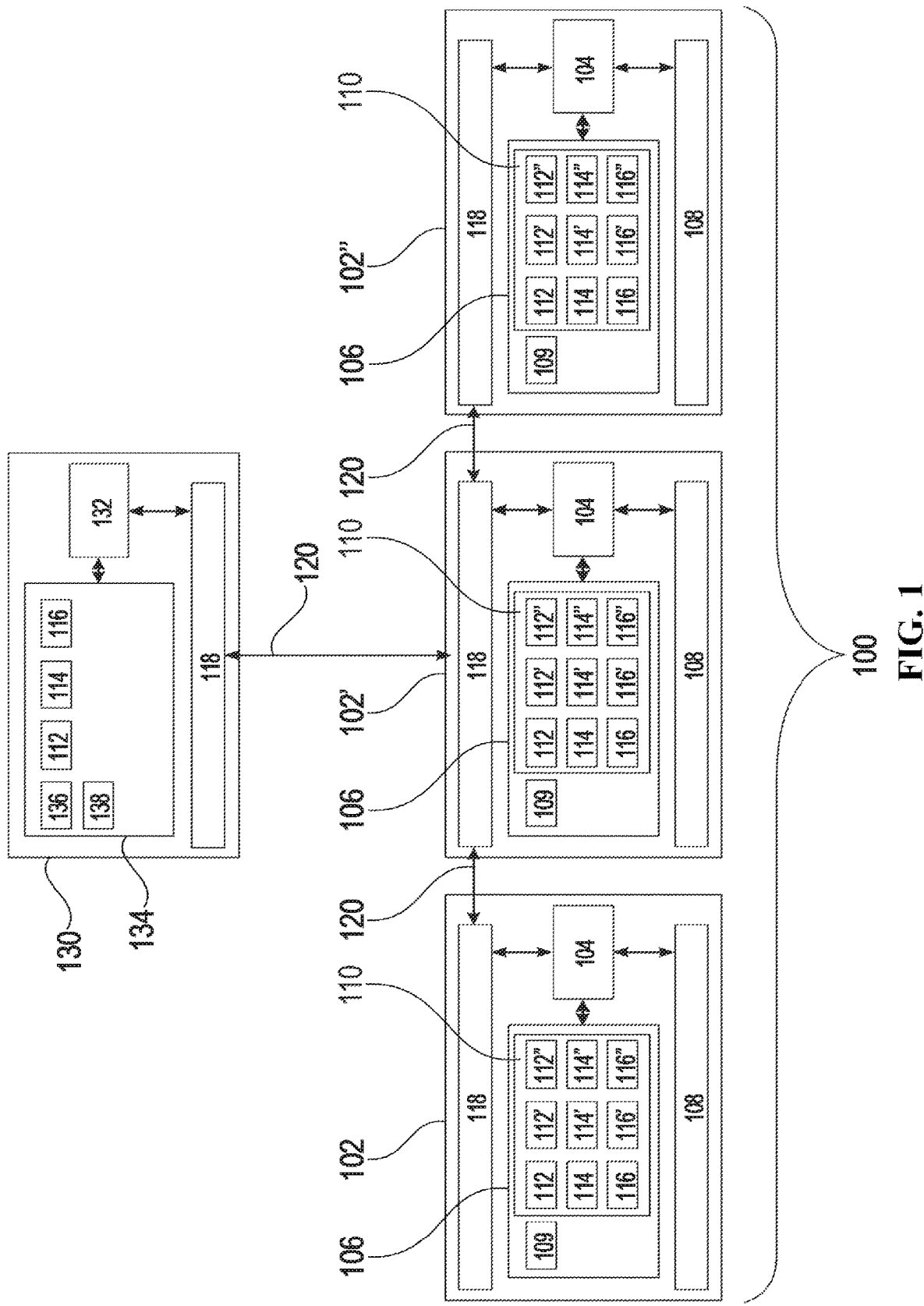
FIG. 1 depicts an implementation of a sensor system.

Examples may have the benefit that if there is a failure of one of the sensor devices its data is not lost. This may support loose collections or associations of sensor devices to work together cooperatively. A sensor device as used herein is a device that incorporates a sensor and is able to record data from that sensor.

In another example, the synchronization is performed using a peer-to-peer file exchange synchronizing by exchanging messages between the sensor devices via the network connection. This embodiment may be beneficial because it provides for a non-centralized storage and replication of the data files from all of the sensor devices. Failure of a single sensor device will not lead to the loss of data beyond the time when the synchronization last took place.

In another example, the sensor system is configured to connect to a repository host via the network connection. The synchronization is performed by each of the sensor devices uploading the data repository from the local data repository and then receiving synchronizing files from the repository host. In this example the synchronization is done via a repository host. The repository host may take a variety of different forms.

In another embodiment, the repository host is a Smartphone. This example may provide for a means of locally maintaining a collection of sensor devices.

In another example, the repository host is a server. For example, one or more of the sensor devices could connect to a server via a variety of type of network connections such as Bluetooth, an internet connection or a cellular data connection.

In another example, the repository host is a cloud computing service. The use of a cloud computing service may be useful because it may provide for the central storage and updating of the local data repository when the user does not possess a central computing or storage device.

The maintaining of the local data repository even when there is a server or a cloud computing service functioning as a repository host may be beneficial because the server or cloud computing service may not always be available to a user. The data is then backed up locally as well as at a different location.

In another example, the repository host comprises a host processor connected to a host memory. The host memory comprises host instructions which cause the processor to implement a master sensor data repository. After synchronization each local sensor data repository is a copy of the master sensor data repository.

In another example, the master sensor data repository is a modified GIT repository. A GIT repository is a repository which is typically used for maintaining source code and in which a copy of the complete repository is stored locally. A modified GIT repository is a GIT repository that has been modified to store sensor data from multiple sensor devices as opposed to storing source code. The modified GIT repository may for example contain code or instructions which cause it to perform basic functions for combining sensor data from multiple sensor devices.

In another example, each data file comprises a timestamp. Each data file further comprises a data type descriptive of a sensor used to acquire the sensor data. Each data file comprises a sensor device identifier. The timestamp, the data type, and the sensor device identifier may be useful in the later use of the sensor data. The timestamp, the data type, and the sensor device identifier may for example be stored as meta data within the data file. In other examples the timestamp, the data type, and/or the sensor device identifier may be included as a file name. The file name in some examples may also include a timestamp or serial number. This may enable the automatic generation of unique file names in some examples. The file name of the data file may not necessarily comprise the timestamp, the data type and the sensor device identifier. For example, the sensor device identifier and a timestamp may be alone enough to generate a unique file name.

In another example, the host instructions cause the host processor to locate missing data in individual data files of the master sensor data repository. The host instructions further cause the host processor to insert replacement data to substitute for the missing data in the individual data files by using the timestamp, the data type, and the sensor device identifier to identify the replacement data in other data files of the master sensor data repository for which the data is not missing. The sensor device identifier is used to select the replacement data according to a predetermined hierarchy of the sensor devices. For example, if power were lost to a sensor or for some reason the sensor was unable to make measurements for a period of time there may be missing data. The host processor may then search other data files to find data which is missing and replace this. If there are more than one source from which the data can be taken it may use a hierarchy which has been determined previously to determine which data file will supply the missing data.

In another example, the host instructions cause the host processor to locate redundant data in the master sensor data repository by searching the master data repository using the timestamp, and the data type. Execution of the host instructions cause the host processor to further maintain redundant data in the master data repository as branches in the local data repository. These branches may for example be branches such as is stored in a GIT repository. The branches may have a hierarchy determined according to a predetermined hierarchy of the sensor devices. For example, if it is known that out of several GPS devices one device is more accurate the various sensor devices can be ranked by this accuracy for a particular type of data. The host processor can then store the duplicate data as branches and identify one particular branch as having the preferred data.

In another example, the host instructions cause the processor to locate redundant data in individual data files of the master sensor data repository using the timestamp and the data type. Execution of the host instructions further cause the host processor to merge redundant data files into merged data files. The redundant data is merged according to a predetermined hierarchy of the sensor device identifier of the sensor devices. In this example all data of a particular type is merged into a merged data file where there is duplicate data from sensors that contain the same type of data they may be combined using a hierarchy which may for example be used to determine which data is the most accurate of most trusted.

In another example, the local instructions further cause the local processor to locate missing data in the local data file. Execution of the local instructions further cause the local processor to insert replacement data in the local data file to substitute for the missing data from the local data repository using the timestamp, the data type, and the sensor identifier. The sensor device identifier is used to select the replacement data according to a predetermined hierarchy of the sensor device identifier of the sensor devices.

In another example, execution of the local instructions further causes the local processor to locate redundant data in the local data file by searching the local data repository using the timestamp and the data type. Execution of the local instructions further cause the local processor to maintain redundant data in the local data file as branches in the local data repository. The branches have a hierarchy determined according to a predetermined hierarchy of the sensor devices.

In another example, execution of the local instructions further causes the local processor to locate redundant data in the local data file by searching the local data repository using the timestamp and the data type. Execution of the local instructions further cause the local processor to merge redundant data in the local data file into merged data files in the local data repository. The redundant data is merged according to a predetermined hierarchy of the sensor device identifier of the sensor devices.

In another example, the sensor system further comprises a computing device comprising a computing device processor coupled to a computing device memory. The computing device memory comprises computing device instructions which, when executed, cause the processor to retrieve at least a portion of the local data repository. Execution of the computing device instructions further cause the computing device processor to generate a report descriptive of the at least a portion of the local data repository. The report is descriptive of any one of the following: an activity summary, weather conditions, a comparison of heart rate with altitude, a travel path, a temporal velocity mapping, and combinations thereof. As an alternative, operations described as being performed by the computing device on the local data repository may also be performed using the master sensor data repository.

In another example, each of the sensor devices is any one of the following: a GPS sensor, an altimeter, a barometer, a body temperature sensor, a respiration monitor, a pedometer, an external temperature sensor, a rain sensor, an activity sensor, a bicycle speed sensor, and combinations thereof. Some sensor devices may measure only one type of sensor data. Other types of sensor devices may record multiple types of sensor data.

In another example, network connection comprises any one of the following: a Bluetooth network connection, a Wi-Fi network connection, an Ethernet connection, an internet connection, a wireless network connection, a mobile cellular network connection, and combinations thereof. The network connection may comprise components of one or all of the above. For example, several sensor devices may connect together via a Bluetooth network connection and others may be connected using a mobile cellular network. The type of network connection may also vary during different time periods. For example, the sensor devices may contain an interface for connecting to a Wi-Fi network. When there is Wi-Fi available the various sensor devices may connect together and/or to the computing device and/or the repository host via the Wi-Fi. When the Wi-Fi is not available the sensor devices may connect together using other means such as Bluetooth or other wireless network connections or even a mobile cellular network connection.

In another example, at least a portion of the sensor devices are battery powered. The storing of the data in each of the sensor devices may be useful when they are battery powered because some sensor devices may run out of power before other sensor devices. This may prevent inadvertently losing data.

In another example, each the data file or data files for each of the different sensor devices all have a unique name.

In another example, the local processor repeatedly stores different sensor data in different or a series of data files.

FIG. 1 illustrates an example of a sensor system 100. The sensor system 100 is shown as being comprised of a number of sensor devices 102, 102', 102". Each sensor device 102, 102', 102" comprises a local processor 104 that is connected to a local memory 106, a sensor 108, and a network interface 118. Each local memory 106 contains local instructions 109 which are used by the local processor 104. Within each local memory 106 is an implementation of a local data repository 110. The local data repository is shown as storing a number of different data files. The processor 104 may acquire sensor data using the sensor 108 and then store it as one of the data files. The local data repository 110 in each of the sensor devices is shown after syncing. The data file 112, 114 and 116 were acquired using the sensor 108 of sensor device 102. The data files 112', 114' and 116' were acquired using the sensor 108 of the sensor device 102'. The data files 112", 114" and 116" were acquired using the sensor 108 of the sensor device 102".

The sensor devices 102, 102', 102" form a peer-to-peer network. The network interfaces 118 form network connections 120 between the sensor devices 102, 102', 102". Synchronization of the local data repository 110 is performed by a sensor device 102 contacting one of the other sensor devices 102' or 102" and copying files that are not present in its local data repository 110 into it. Each of the sensor devices 102, 102', 102" maintains a complete copy of the local data repository 110 after syncing.

FIG. 1 is also shown as containing an optional computing device 130. The computing device 130 comprises a computing device processor 132 that is connected with a computing device memory 134 and computing device instructions 136. The computing device instructions 136 enable the computing device processor 132 to process and analyze data. The computing device memory 134 is shown as containing the data files 112, 114 and 116 which it has copied from the local data repository 110 of sensor system 102'. Although the data was acquired by the sensor system 102, since there is a complete copy of the local data repository 110, it does not matter which of the sensor devices 102, 102', 102" the computing device 130 copies the data 112, 114, 116 from. Execution of the computing device instructions 136 cause the computing device processor 132 to generate a report 138 that provides a summary or statistical information about the data contained within the data files 112, 114 and 116.

Figure 2:
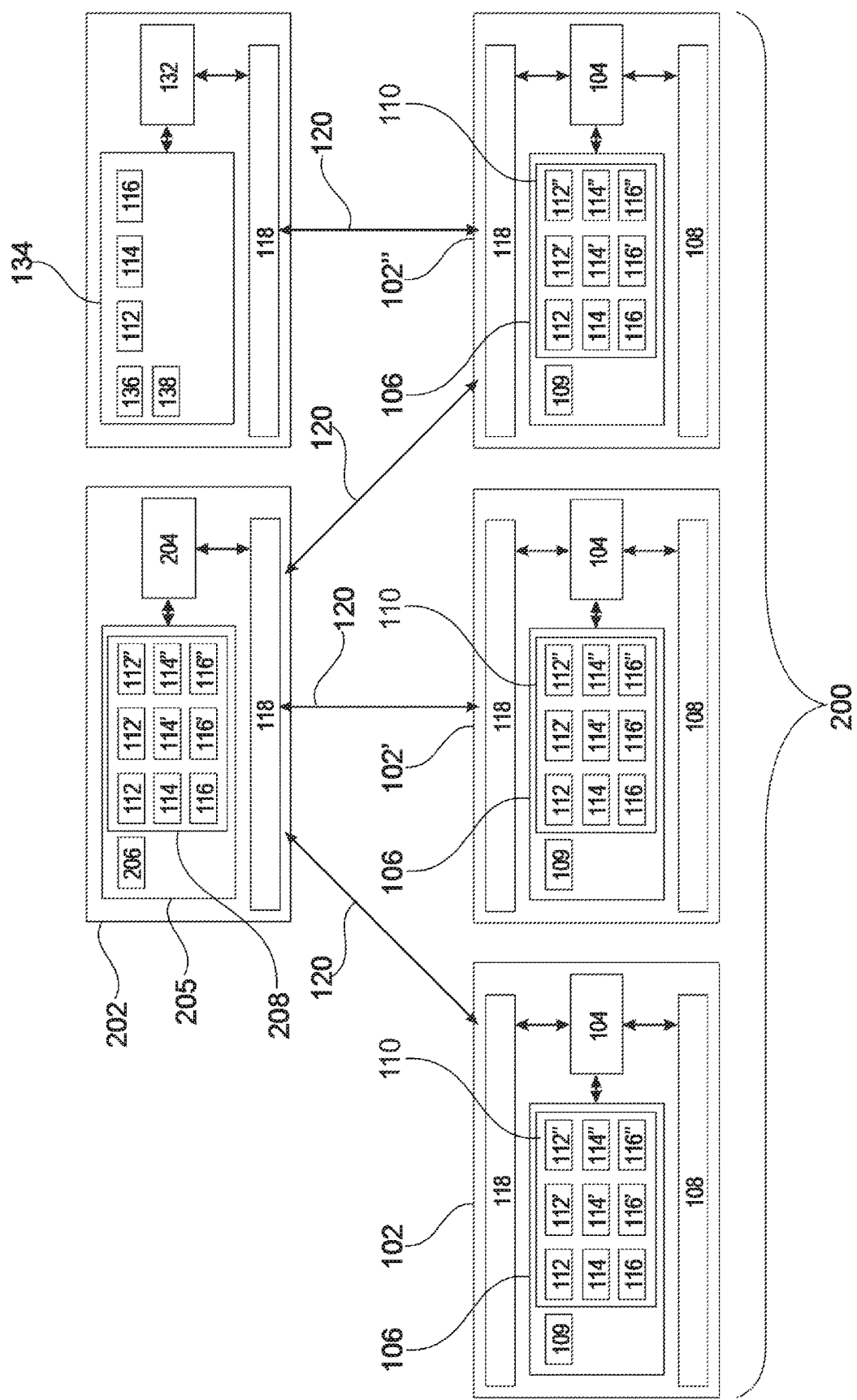
FIG. 2 depicts a further implementation of a sensor system.

FIG. 2 illustrates a further example of a sensor system 200. The sensor system in FIG. 2 is similar to the sensor system depicted in FIG. 1. There are however several differences. In FIG. 2 the sensor devices 102, 102', 102" do not exchange data in a peer-to-peer fashion. Instead the sensor devices 102, 102', 102" are shown as forming a network connection 120 with a repository host 202.

The repository host 202 comprises a repository host processor 204 that is connected to a repository host memory 205 and a network interface 118. The repository host memory 205 is shown as containing repository host instructions 206 that enable the processor 204 to implement a master sensor data repository 208. After the sensor devices 102, 102', 102" have acquired sensor data and stored them in data files they then push the acquired data files to the repository host 202 which copies them into the master sensor data repository 208. It can be seen that the master sensor data repository 208 contains the data files 112, 112', 112", 114, 114', 114", 116, 116', 116". The master sensor data repository 208 then provides all of these data files to the sensor devices 102, 102', 102" so that they can be copied into the local data repositories 110. The master sensor data repository 208 could be implemented in a fashion similar to a GIT archive.

In FIG. 2 the optional computing device 130 is again depicted as having copied data 112, 114, 116 from the sensor system 200. Alternatively, the computing device 130 could copy data from the master sensor data repository 208 also.

Figure 3:
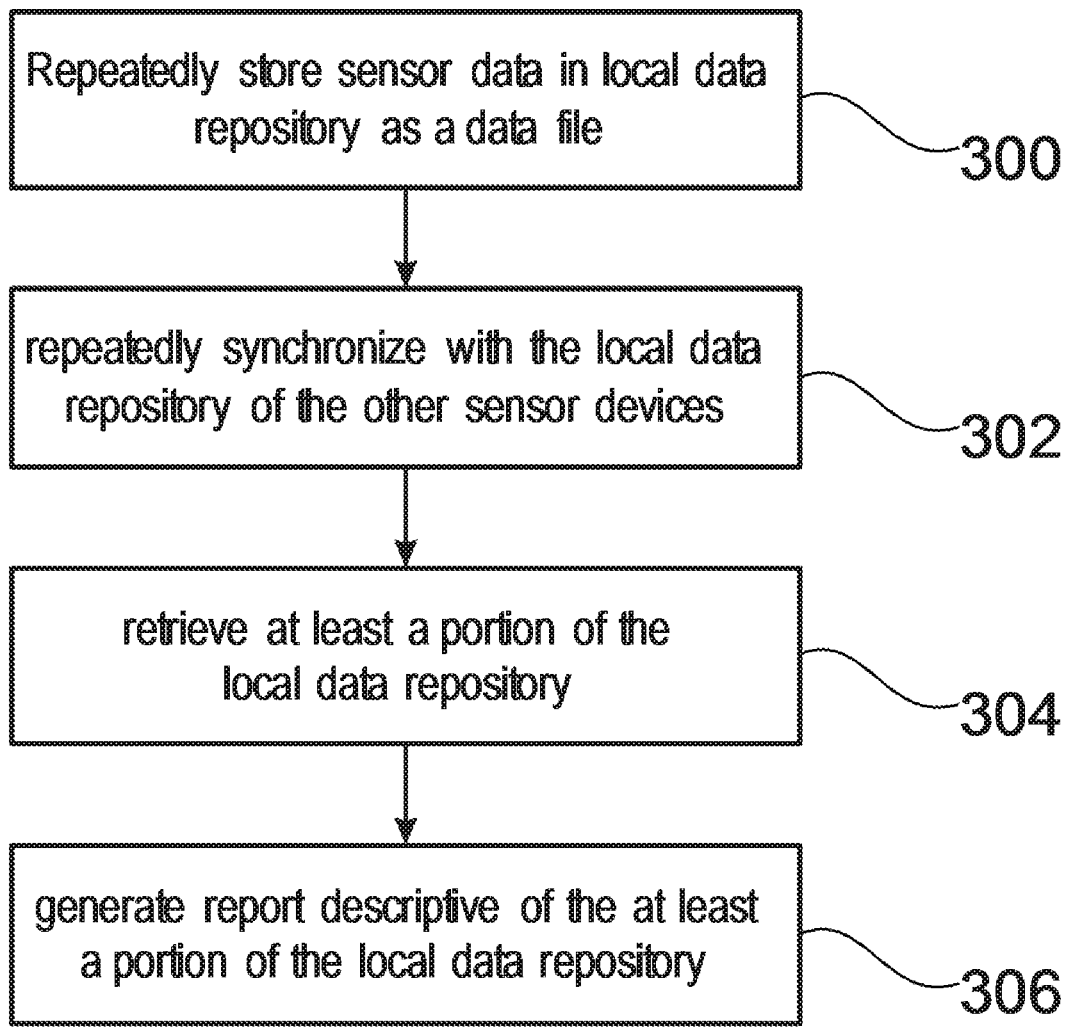
FIG. 3 shows a block diagram that illustrates a method of operating the sensor system of FIG. 1 or 2.

FIG. 3 shows a flowchart which illustrates a method of operating the sensor system 100 of FIG. 1 or the sensor system 200 of FIG. 2. First in step 300 the local processor 104 is caused by the local instructions 109 to acquire sensor data using the sensor 108. This is then stored as data files. For example, the sensor device 102 stores the data files 112, 114 and 116 as the sensor data is acquired. Each of the data files 112, 112', 112", 114, 114', 114", 116, 116', 116" has a unique name or file name.

Next in step 302 the sensor devices 102, 102', 102" repeatedly synchronize the local data repository 110 with the other sensor devices. Each local data repository 110 retains a complete copy of the data files of the sensor devices after synchronization. In FIG. 2 this is done using the repository host 202 to do the maintaining and synchronization centrally. In FIG. 1 this is done using a peer-to-peer network.

Step 304 is an optional step where the computing device 130 retrieves at least a portion 112, 114, 116 of the local data repository 110. The method then proceeds to optional step 206 where the computing device processor 132 generates a report 138 using the data 112, 114 and 116.

Figure 4:
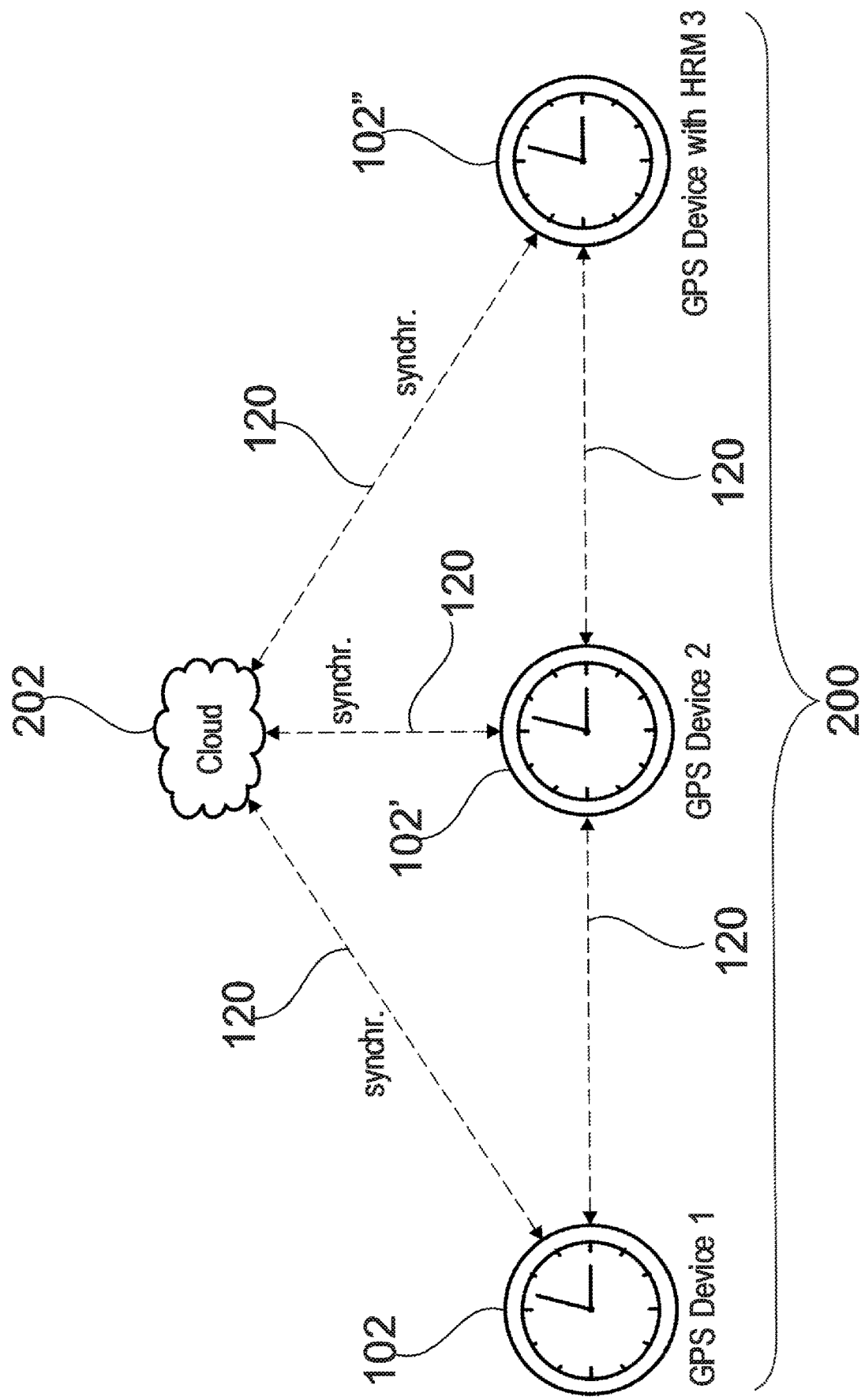
FIG. 4 depicts a further implementation of a sensor system.

FIG. 4 illustrates a concrete example of a sensor system 200. The sensor system comprises a GPS device 102, a second GPS device 102', and a third GPS device 102". The third GPS device 102" also incorporates a heart rate monitor. In this example the GPS devices 102, 102', 102" are able to exchange data with each other in a peer-to-peer fashion via network connection 120. In addition, they are also able to exchange data with a repository host 202 that is in this case a cloud computing service. In the example in FIG. 4 synchronization is performed using the repository host 202.

Figure 5:
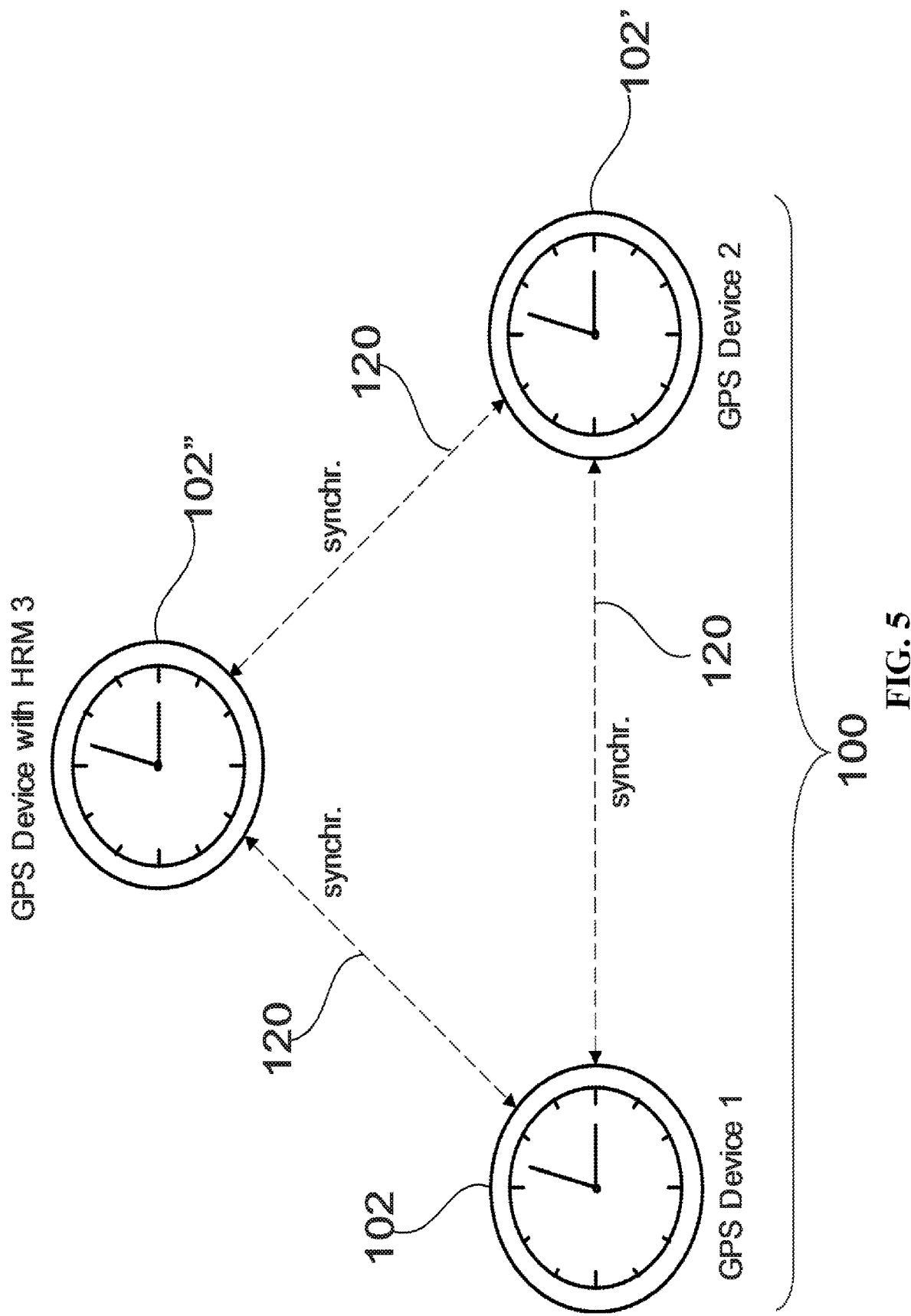
FIG. 5 depicts a further implementation of a sensor system.

FIG. 5 shows a concrete example of a sensor system 100. This example is similar to the example in FIG. 4. There is again a first GPS device 102, a second GPS device 102' and a third GPS device 102". The third GPS device 102" again comprises a heart rate monitor or HRM. The sensor devices 102, 102', 102" exchange data in a peer-to-peer fashion as is illustrated in FIG. 1. The sensor devices 102, 102', 102" may switch between the two operating modes depicted in FIGS. 4 and 5. Likewise, the sensor devices 102, 102', 102" depicted in FIGS. 1 and 2 may switch between the two modes of operation also. If there is no repository host 102 that the sensor system 100 or 200 can connect to it may switch into the mode of operation depicted by the sensor system 100 in FIG. 5 or 1.

Figure 6:
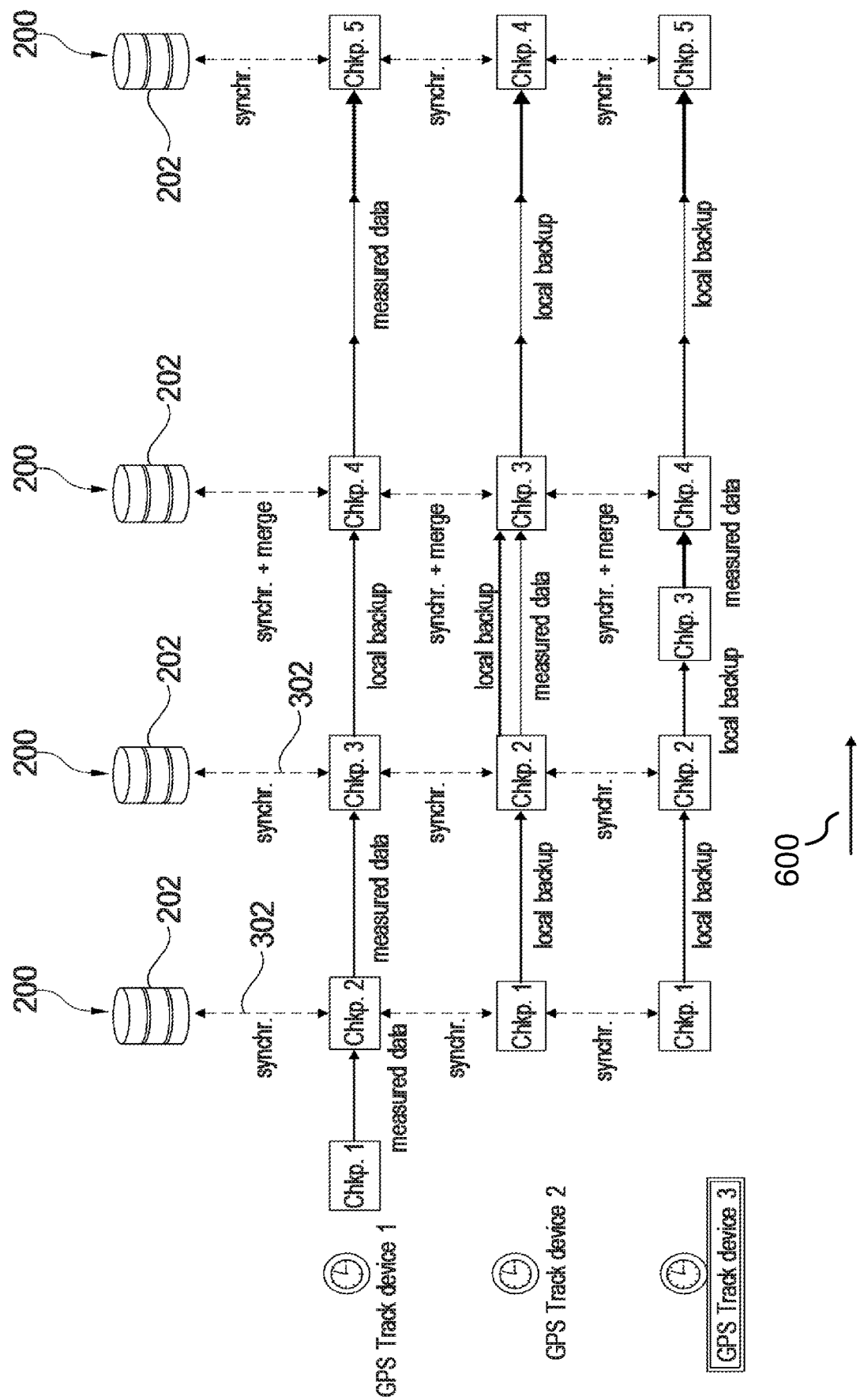
FIG. 6 depicts a further implementation of a sensor system.

FIG. 6 depicts a data flow for the sensor system 200 of FIG. 4. In this example the GPS devices 102, 102', 102" are only able to connect to the repository host 202 when at specific checkpoints or has been programmed to contact the repository host at specific checkpoints. Checkpoint is abbreviated Chkp. in FIG. 6. When at specific checkpoints the data may be transferred to and from the repository host 202. The repository host may provide synchronization 302 as well as the merging of data. For example, there may be a hierarchy between the different GPS devices 102, 102', 102" and the GPS data may be merged. The arrow 600 depicts the direction of increasing time.

During use of a sensor system, it might happen that one loses data measured by a smart watch or Global Positioning System (GPS) or with a Hear Rate Monitor (HRM) device. Main reasons of data loss or inconsistency include power outages and damage to a device. Sometimes one would also like to track one's daily activities by using multiple inspectors (sensor devices) having full confidence of data consistency. However, switching to another device can also cause problems with data synchronization.

Examples may address the problems described above; including the loss of data from a device that was damaged or a device that cannot continue working because of a power outage.

Examples may use of version control software to provide a Disaster Recovery Method for Storage into a data model in which data is measured by multiple sensor devices. Such an approach allows for continuously measuring data ensuring high confidence in its consistency.

Examples may provide a means of protecting data from loss and synchronizing data collected from multiple measuring devices (sensor devices) such as GPS, Heart Rate Monitor, Multisport Devices. Some examples could be compared to the source control system in the software development life-cycle. The difference is that we have data measured by different inspectors rather than code delivered by many developers during implementation. Each device may store a local copy of synchronized data from all measuring points and/or centralized storage (e.g. cloud). In this case, the pear to pear reflection at any point in time may occur because device stores always a local full copy of the entire repository. In case a device is damaged, data from other devices is recovered and used for further tracking. This example may also allow for continuous tracking from many devices during the whole period of measurement without worrying for data inconsistency.

Based on a checkpoint that is set up by the user, all tracking devices can also send their data to a central point, synchronize, merge, and store the created baseline locally. This example may allow users to have a disaster recovery scenario on data from devices that are likely to be damaged or prone to power outages. Even in a case when (n−1) devices are lost, still the user will not lose any data.

Examples may have one or more of the following features:
1. All devices registered for one user represent one project repository.
2. After a period of time configured by the user, a local copy of the data measured by one device is sent to a cloud or another device that is in the network connection.
3. During synchronization, the following operations are done (similar to a GIT repository):
   a) When the same set of data is analyzed, the data can be:
   Saved if there are no conflicts. Another copy of data is created in this case.
   Merged with existing data if there are no conflicts. For example, new measurements are added after a particular activity is completed (transition from a bike to run, and from one device to another).
   When a conflict occurs, two different branches are created and stored. Later on, the user can choose manually which data stays, and which is removed.
   b) When data from different sources is analyzed, new streamline is created
4. When data synchronization finishes, copies on both endpoints are the same.

Example of use a sensor system may include:
1. Using multiple devices to track the total time and distance of long multi-sport activities. Benefits may include having a total continuous track backed up on many devices without the risk of losing data and having a gap in integrity during transition.
2. Protecting from data loss if a device is damaged or in case of a power outage. Benefits may include not losing data when a device loses communication and ability of tracking. Another device may take responsibility for continuing tracking on a backup and synchronized data set.
3. Measuring the same activities from many sources, like marathon is measured by smart watch, official chip, and/or runner's application. Benefits may include the ability to decide if you would like to have 3 independent tracks, 1 merged track or choose the best sources with most valuable information by smoothly switching between them.

Computer System

Figure 7:
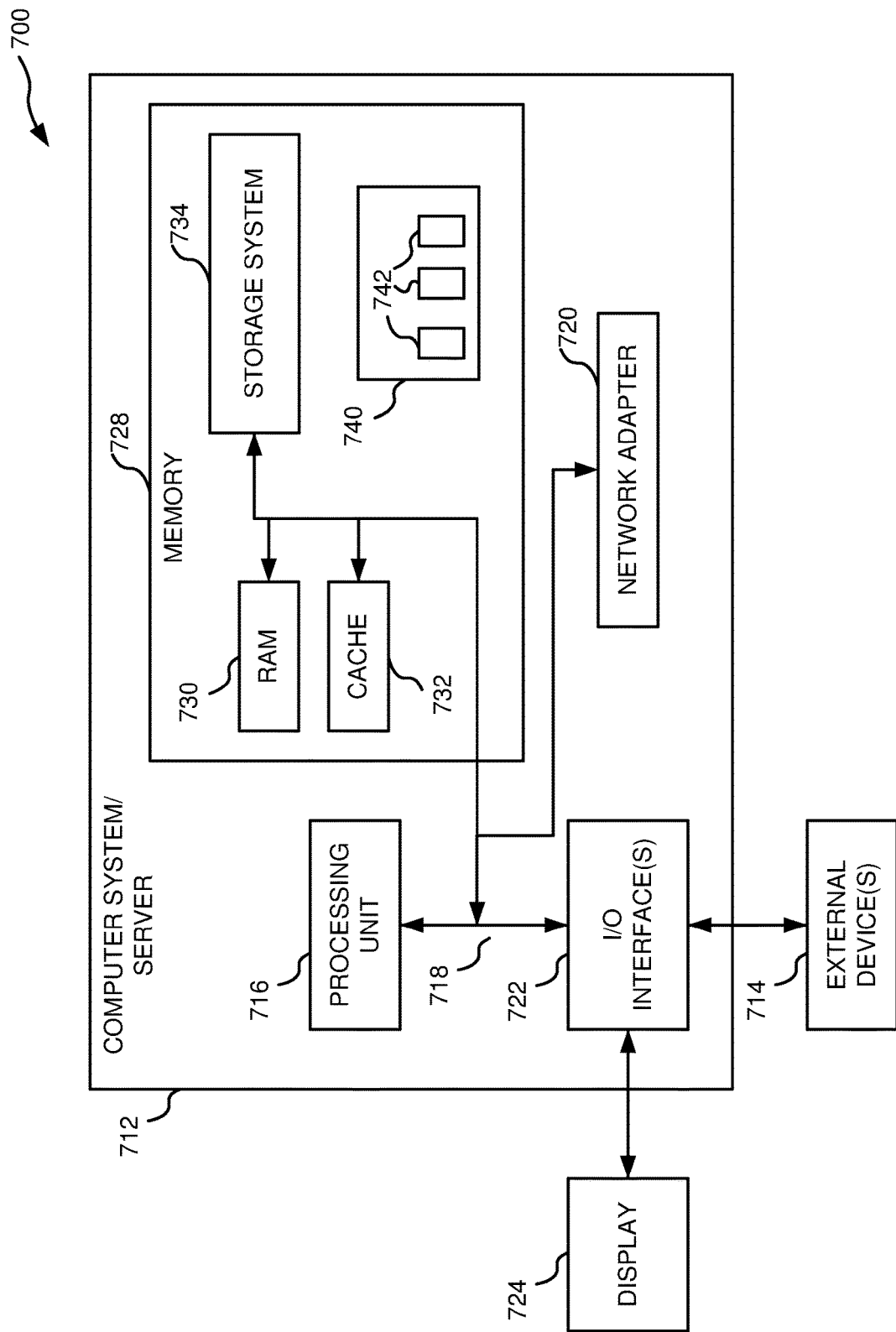
FIG. 7 depicts a computer system in accordance with an exemplary embodiment of the present invention.

In an exemplary embodiment, the sensor system is a computer system 700 as shown in FIG. 7. Computer system 700 is only one example of a computer system and is not intended to suggest any limitation as to the scope of use or functionality of embodiments of the present invention. Regardless, computer system 700 is capable of being implemented to perform and/or performing any of the functionality/operations of the present invention.

Computer system 700 includes a computer system/server 712, which is operational with numerous other general purpose or special purpose computing system environments or configurations. Examples of well-known computing systems, environments, and/or configurations that may be suitable for use with computer system/server 712 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices.

Computer system/server 712 may be described in the general context of computer system-executable instructions, such as program modules, being executed by a computer system. Generally, program modules may include routines, programs, objects, components, logic, and/or data structures that perform particular tasks or implement particular abstract data types. Computer system/server 712 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer system/server 712 in computer system 700 is shown in the form of a general-purpose computing device. The components of computer system/server 712 may include, but are not limited to, one or more processors or processing units 716, a system memory 728, and a bus 718 that couple various system components including system memory 728 to processor 716.

Bus 718 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 712 typically includes a variety of computer system readable media. Such media may be any available media that is accessible by computer system/server 712, and includes both volatile and non-volatile media, removable and non-removable media.

System memory 728 can include computer system readable media in the form of volatile memory, such as random access memory (RAM) 730 and/or cache memory 732. Computer system/server 712 may further include other removable/non-removable, volatile/non-volatile computer system storage media. By way of example only, storage system 734 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 718 by one or more data media interfaces. As will be further depicted and described below, memory 728 may include at least one program product having a set (e.g., at least one) of program modules that are configured to carry out the functions/operations of embodiments of the invention.

Program/utility 740, having a set (at least one) of program modules 742, may be stored in memory 728 by way of example, and not limitation. Exemplary program modules 742 may include an operating system, one or more application programs, other program modules, and program data.

Each of the operating system, one or more application programs, other program modules, and program data or some combination thereof, may include an implementation of a networking environment. Program modules 742 generally carry out the functions and/or methodologies of embodiments of the present invention.

Computer system/server 712 may also communicate with one or more external devices 714 such as a keyboard, a pointing device, a display 724, one or more devices that enable a user to interact with computer system/server 712, and/or any devices (e.g., network card, modem, etc.) that enable computer system/server 712 to communicate with one or more other computing devices. Such communication can occur via Input/Output (I/O) interfaces 722. Still yet, computer system/server 712 can communicate with one or more networks such as a local area network (LAN), a general wide area network (WAN), and/or a public network (e.g., the Internet) via network adapter 720. As depicted, network adapter 720 communicates with the other components of computer system/server 712 via bus 718. It should be understood that although not shown, other hardware and/or software components could be used in conjunction with computer system/server 712. Examples, include, but are not limited to: microcode, device drivers, redundant processing units, external disk drive arrays, RAID systems, tape drives, and data archival storage systems.

Cloud Computing

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 8:
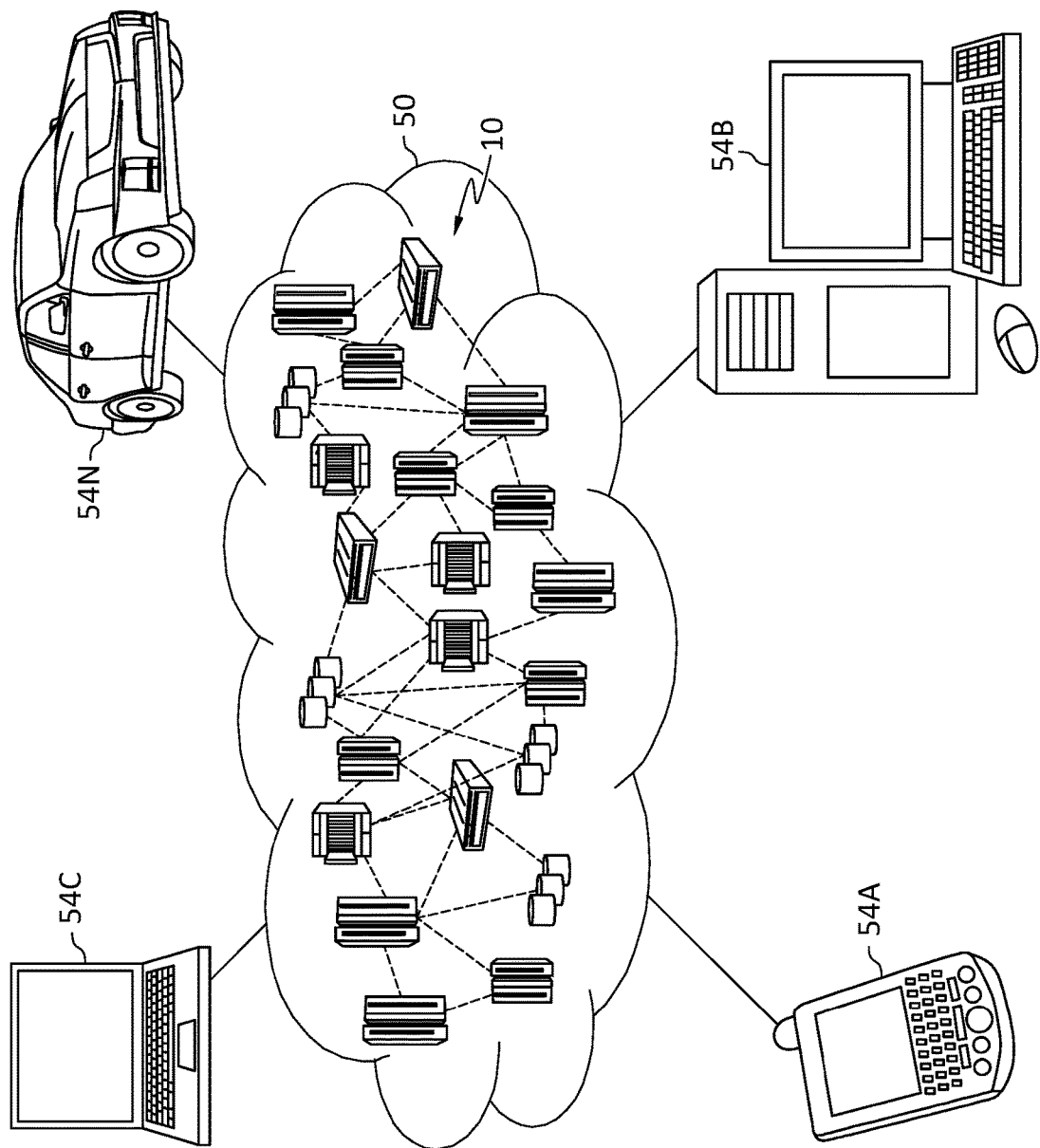
FIG. 8 depicts a cloud computing environment according to various embodiments of the present invention.

Referring now to FIG. 8, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Figure 9:
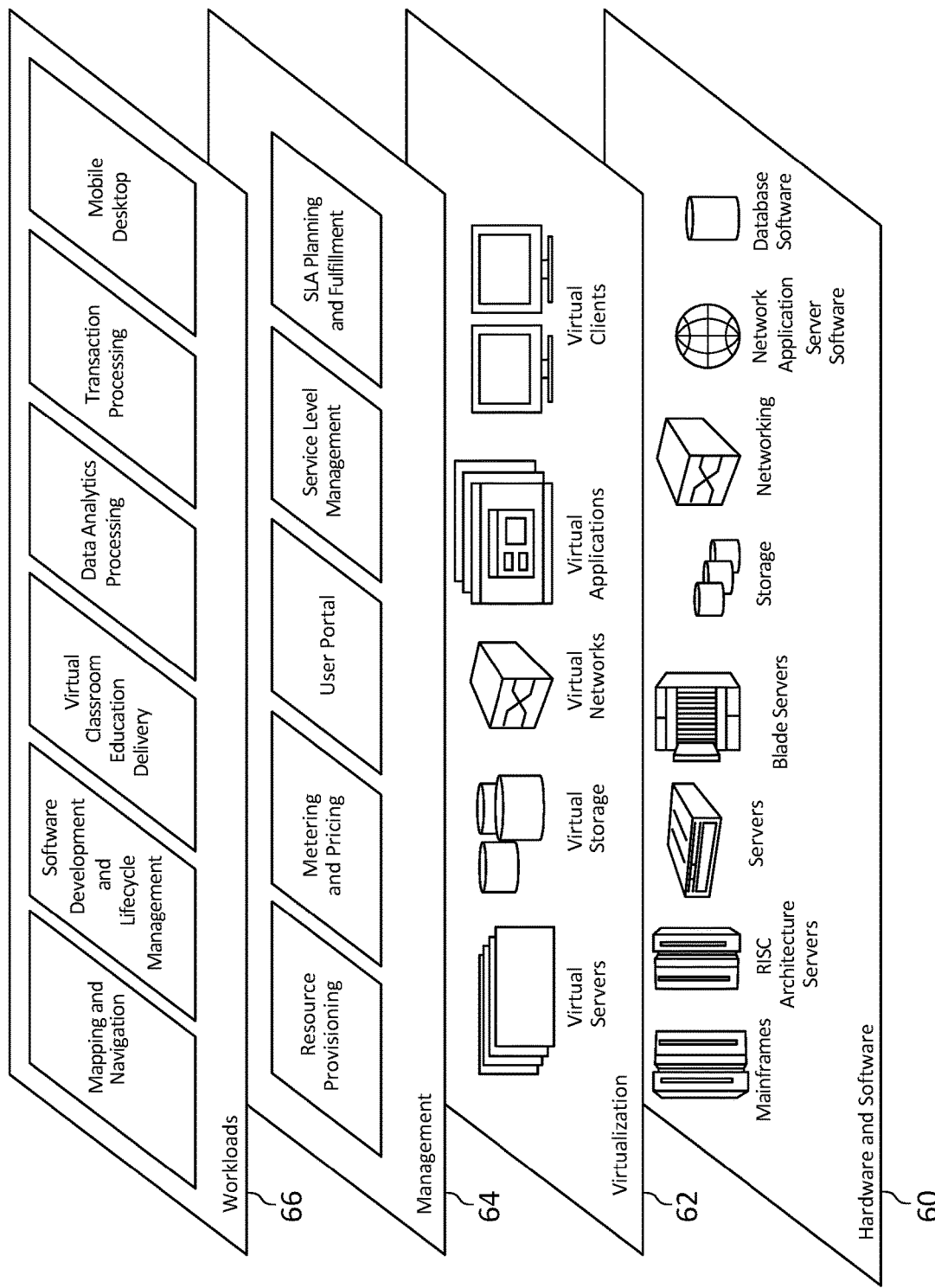
FIG. 9 depicts abstraction model layers according to various embodiments of the present invention.

Referring now to FIG. 9, a set of functional abstraction layers provided by cloud computing environment 50 is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes; RISC (Reduced Instruction Set Computer) architecture based servers; storage devices; networks and networking components. In some embodiments, software components include network application server software.

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and mobile desktop.

Computer Program Product

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, JAVA, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A sensor system, wherein the sensor system comprises sensor devices, wherein the sensor devices are configured for exchanging data via a network connection, wherein each of the sensor devices is configured to measure sensor data, wherein each of the sensor devices comprises a local processor and a local memory coupled to the local processor, each local memory comprises a local data repository, wherein the local memory comprises local instructions which, when executed by the local processor, cause the local processor to:

repeatedly store the sensor data for a first sensor device, from the sensor devices, in the local data repository for the first sensor device as a data file, wherein each data file stored has a unique name;

repeatedly synchronize with each local data repository of other sensor devices, wherein each local data repository for each sensor device maintains a complete copy of the data files for the sensor devices after synchronization;

determine that a second sensor device of the other sensor devices is no longer providing a second type of sensor data for at least the second sensor device; and track the second type of sensor data for the second sensor device on the first sensor device, wherein the first sensor device measures the second type of sensor data.

2. The sensor system of claim 1, wherein the synchronization is performed using a peer-to-peer file exchange synchronized by exchanging messages between the sensor devices via the network connection.

3. The sensor system of claim 1, wherein the sensor system is configured to connect to a repository host via the network connection, wherein the synchronization is performed by the each of the sensor devices uploading the data repository from the local data repository and then receiving synchronizing files from a repository host.

4. The sensor system of claim 3, wherein the repository host is at least one a smart phone, a server, and a cloud computing service.

5. The sensor system of claim 1, wherein the repository host comprises a host processor connected to a host memory, wherein the host memory comprises host instructions which cause the processor to implement a master sensor data repository, and wherein after synchronization each local data repository is a copy of the master sensor data repository.

6. The sensor system of claim 5, wherein the master sensor data repository is a modified Git repository.

7. The sensor system of claim 5, wherein each of the data file comprises a time stamp, and wherein each of the data file further comprises a data type descriptive of a sensor used to acquire the sensor data, wherein each data file comprises a sensor device identifier.

8. The sensor system of claim 7, wherein execution of the host instructions further causes the host processor to:
locate missing data in individual data files of the master sensor data repository; and
insert replacement data to substitute for the missing data in the individual data files by using the time stamp, the data type, and the sensor device identifier to identify the replacement data in other data files of the master sensor data repository for which data is not missing, wherein the sensor device identifier is used to select the replacement data according to a predetermined hierarchy of the sensor devices.

9. The sensor system of claim 7, wherein execution of the host instructions further causes the host processor to:
locate redundant data in the master sensor data repository by searching the master data repository using the time stamp, and the data type; and
maintain redundant data in the master data repository as branches in the local data repository, wherein the branches have a hierarchy determined according to a predetermined hierarchy of the sensor devices.

10. The sensor system of claim 9, wherein execution of the host instructions further causes the host processor to:
locate redundant data in individual data files of the master sensor data repository using the time stamp, and the data type; and
merge redundant data into merged data files, wherein the redundant data is merged according to a predetermined hierarchy of the sensor device identifier of the sensor devices.

11. The sensor system of claim 1, wherein each of the data file comprises a time stamp, wherein each data file further comprises a data type descriptive of a sensor used to acquire the sensor data, and wherein each of the data file comprises a sensor device identifier.

12. The sensor system of claim 11, wherein execution of the local instructions further causes the local processor to:
locate missing data in the data file, and
insert replacement data in the data file to substitute for the missing data from the local data repository using the time stamp, the data type, and the sensor device identifier, wherein the sensor device identifier is used to select the replacement data according to a predetermined hierarchy of the sensor device identifier of the sensor devices.

13. The sensor system of claim 11, wherein execution of the local instructions causes the local processor to:
locate redundant data in the data file by searching the local data repository using the time stamp and the data type; and
maintain redundant data in the data file as branches in the local data repository, wherein the branches have a hierarchy determined according to a predetermined hierarchy of the sensor devices.

14. The sensor system of claim 11, wherein execution of the local instructions further causes the local processor to:
locate redundant data in the data file by searching the local data repository using the time stamp and the data type; and
merge redundant data in the data file into merged data files in the local data repository, wherein the redundant data is merged according to a predetermined hierarchy of the sensor device identifier of the sensor devices.

15. The sensor system of claim 1, wherein the sensor system further comprises a computing device comprising a computing device processor coupled to a computing device memory, the computing device memory comprises computing device instruction which, when executed, cause the computing device processor to:
retrieve at least a portion of the local data repository; and
generate a report descriptive of the at least a portion of the local data repository, wherein the report is descriptive of at least one of an activity summary, weather conditions, a comparison of heart rate with altitude, a traveled path, and a temporal velocity mapping.

16. The sensor system of claim 1, wherein each of the sensor devices is at least one of a GPS sensor, an altimeter, a barometer, a body temperature sensor, a respiration monitor, a pedometer, an external temperature sensor, a rain sensor, an activity sensor, and a bicycle speed sensor.

17. The sensor system of claim 1, wherein the network connection comprises at least one of a Bluetooth network connection, a wi-fi network connection, an Ethernet connection, an internet connection, a wireless network connection, and a mobile cellular network connection.

18. The sensor system of claim 1, wherein at least a portion of the sensor devices are battery powered.

19. A method of operating a sensor system, wherein the sensor system comprises sensor devices, wherein the sensor devices are configured for exchanging data via a network connection, wherein each of the sensor devices is configured to measure sensor data wherein each of the sensor devices comprises a local processor and a local memory coupled to the local processor, each local memory comprises a local data repository, wherein the local memory comprises local instructions which, when executed by the local processor, cause the local processor to perform the method of:
- repeatedly storing the sensor data for a first sensor device, from the sensor devices, in the local data repository for the first sensor device as a data file, wherein each data file stored has a unique name;
- repeatedly synchronizing each local data repository of other sensor devices, wherein each local data repository for each sensor device maintains a complete copy of the data files for the sensor devices after synchronization;
- determining that a second sensor device of the other sensor devices is no longer providing a second type of sensor data for at least the second sensor device; and
- tracking the second type of sensor data for the second sensor device on the first sensor device, wherein the first sensor device measures the second type of sensor data.

20. A computer program product for operating a sensor system, the computer program product comprising a computer readable storage medium having program instructions embodied therewith, wherein the sensor system comprises sensor devices, wherein the sensor devices are configured for exchanging data via a network connection, wherein each of the sensor devices is configured to measure sensor data, wherein each of the sensor devices comprises a local processor and a local memory coupled to the local processor, each local memory comprises a local data repository, the program instructions executable by the local processor to cause the sensor device to perform a method comprising:
- repeatedly storing the sensor data for a first sensor device, from the sensor devices, in the local data repository for the first sensor device as a data file, wherein each data file stored has a unique name;
- repeatedly synchronizing each local data repository of other sensor devices, wherein each local data repository for each sensor device maintains a complete copy of the data files for the sensor devices after synchronization;
- determining that a second sensor device of the other sensor devices is no longer providing a second type of sensor data for at least the second sensor device; and
- tracking the second type of sensor data for the second sensor device on the first sensor device, wherein the first sensor device measures the second type of sensor data.

* * * * *